(No Model.) 2 Sheets—Sheet 1.

A. McVEETY.

BAND CUTTING AND FEEDING MECHANISM FOR THRASHING MACHINES.

No. 330,507. Patented Nov. 17, 1885.

Witnesses
R. H. Sanford.
Geo. McNeir.

Inventor
Alexander McVeety
By J. A. O. Paul
Atty.

(No Model.)  A. McVEETY.  2 Sheets—Sheet 2.

BAND CUTTING AND FEEDING MECHANISM FOR THRASHING MACHINES.

No. 330,507.  Patented Nov. 17, 1885.

Witnesses
R. H. Sanford.
Geo. McNeil

Inventor
Alexander McVeety.
By A. C. Paul,
His Atty.

UNITED STATES PATENT OFFICE.

ALEXANDER McVEETY, OF HOWARD, ASSIGNOR OF ONE-HALF TO JOHN KEYS, OF HENNEPIN COUNTY, MINNESOTA.

BAND-CUTTING AND FEEDING MECHANISM FOR THRASHING-MACHINES.

SPECIFICATION forming part of Letters Patent No. 330,507, dated November 17, 1885.

Application filed April 20, 1885. Serial No. 162,867. (No model.)

*To all whom it may concern:*

Be it known that I, ALEXANDER McVEETY, a citizen of the United States, residing at Howard, in the county of Wright and State of Minnesota, have invented certain new and useful Improvements in Band Cutting and Feeding Mechanisms for Thrashing-Machines, of which the following is a specification.

My invention relates to improvements in mechanism for cutting the bands on bundles of grain and feeding the grain into thrashing-machines; and my invention consists, generally, in the construction and combination of devices hereinafter described, and particularly pointed out in the claims.

Figure 1:
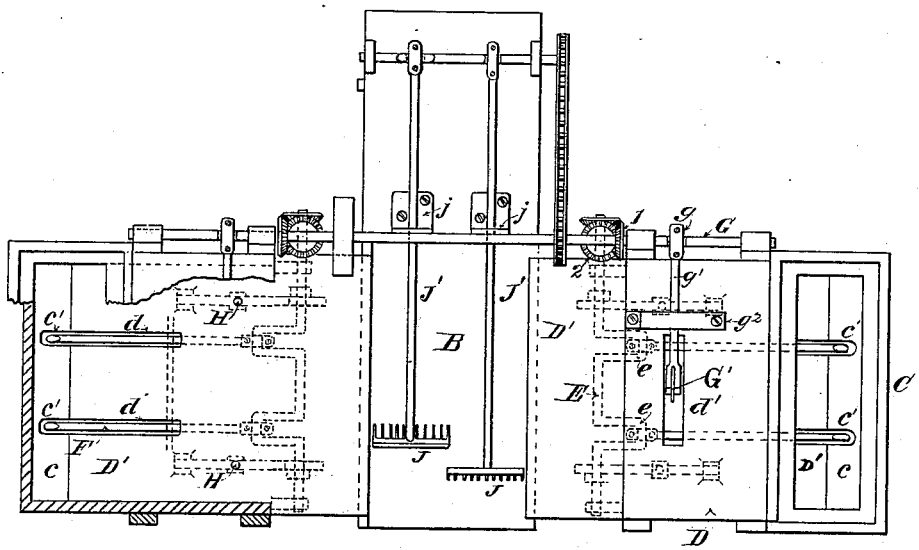
Figure 2:
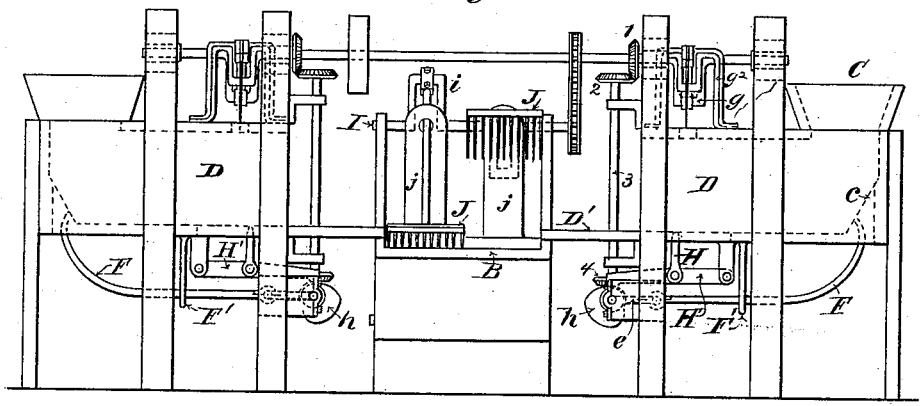
Figure 3:
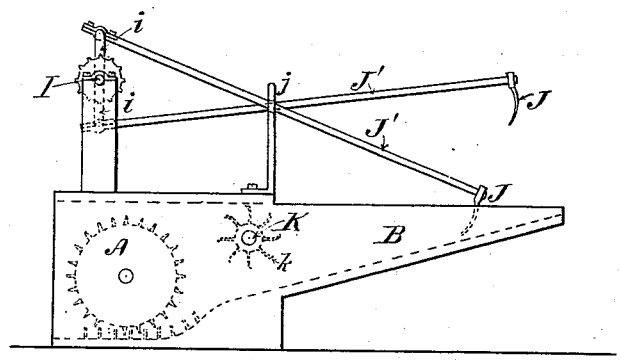
Figure 4:
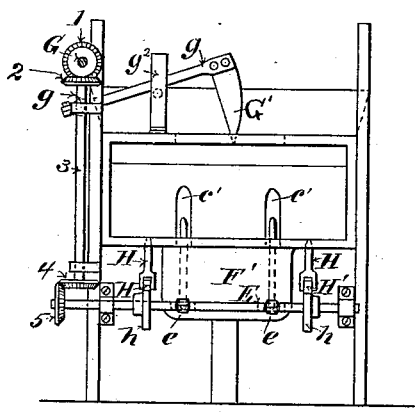

In the accompanying drawings, forming part of this specification, Figure 1 is a plan partly broken away. Fig. 2 is a front elevation; Fig. 3, side elevation of the feeding device; Fig. 4, elevation of band-cutting device.

A in the drawings represents the thrashing-cylinder. B is the feed-table. The band-cutting mechanism is in duplicate upon each side of the feed-table. In the description following, reference will be made to but one of these devices, it being understood that the other is in all respects similar.

C is a hopper, into which the bundles of grain are thrown with the heads of the grain toward the thrashing-cylinder. This hopper opens into a covered box, D, which has a bottom, D', extending out to the feed-table B, and forming a feed-board from the hopper to this feed-table. The box D is closed at its ends and has a covered top. The hopper-bottom $c$ is inclined, as shown, to direct the grain-bundles onto the box-bottom D'. The hopper-bottom $c$ is slotted at $c'$, and the bottom D' of box D is slotted at $d$. Beneath box D is journaled a shaft, E, extending substantially parallel with the feed-table B. This shaft is provided with two similar cranks, $e$ $e$. Mounted on these cranks and operated by them are the feed-arms F F, having the upwardly-extending ends, as shown. These arms are secured loosely to the crank-shaft, and they extend through the slotted rest and guide F', which is attached to the under side of box D. As the crank-shaft is rotated, the ends of the feed-arms project through the slots in the hopper-bottom, and then move forward toward the feed-table B. Having moved in this elevated position the length of the slots $d$, they are drawn through the slots and beneath the box by the movement of the cranks, and are moved back under the box to be again projected through the slotted bottom of the hopper.

G is a shaft journaled above and at one side of the box D and at right angles to the shaft E. This shaft has a crank, $g$, upon which is secured loosely the carrying-arm $g'$ of the band-cutting knife G'. The arm $g'$ passes through the slotted rest and guide $g^2$. The top of box D is slotted at $d'$, and through this slot the knife is projected into the box to cut the band of the bundle. This knife is of hook form, and as the crank-shaft is rotated the knife is projected into the box so that its point will bury itself in the bundle to a sufficient depth to insure passing below the band, and the knife is then drawn toward the crank-shaft, its point plowing along for a considerable distance in the bundle and insuring the cutting of the band, although the bands may vary in position on the bundles by a foot or more. The knife is then drawn out of the box, and when the next bundle is in position beneath slot $d'$, the knife is again projected through the slot, and cuts the band, as before.

H H are plungers that are projected through the bottom of box D into the bundle that is beneath the knife to hold it in position while its band is cut. The plungers are pointed, as shown, and they are preferably arranged directly below the slot $d'$, but not in position to interfere with the knife. These plungers are supported on the pivoted arms H' H', whose free ends rest on the cams $h$ on the shaft E. As the shaft E is rotated, these plungers are alternately raised and lowered. The cams and shafts are so arranged relatively to each other that when a bundle of grain has been moved by the feed-arms F F beneath the knife the plungers are projected into the bundle, and remain there until the band has been cut by the knife. The plungers are then withdrawn, and this bundle is pushed toward the feed-table B by the next bundle that is moved forward by the arms F F. I have also shown a feed mechanism in connection with table B, which I prefer to use with the described band-cutter to feed the grain to the thrashing-cylinder. Other devices may be used, however, for this purpose.

Upon the thrashing-machine is mounted a shaft, I, having the oppositely-set cranks $i$ $i$. J J are rakes having curved teeth carried upon the ends of rods J' J', which pass through the slotted guides $j j$, and are attached to the crank-arms $i$ $i$. As the shaft I is rotated the rakes alternately drop onto the feed-table, are drawn toward the thrashing-cylinder, are then elevated and moved back to be again dropped onto the feed-table. The last movement of the feed-rake while in contact with the grain is in an upward direction, and to prevent throwing the grain against the upper part of the thrashing-cylinder I provide the toothed roller K, which is mounted over the feed-table in front of the upper part of the cylinder. This roller has the reversely-pointed teeth $k$, and it serves to beat the grain down to the cylinder, and to loosen up the bundle and spread the grain. As the teeth are pointed backward, they do not become entangled with the grain.

Any suitably-connected positive mechanism may be used to drive the several operating-shafts, a preferable arrangement being shown.

The shaft G is driven by a belt from the thrashing-machine. This shaft has a bevel-gear, 1, which meshes with a similar gear, 2, on a shaft, 3, which is provided with a gear, 4, meshing with gear 5 on shaft E. From shaft G by an endless chain the shaft I is rotated. The roll K may be driven by a belt from the thrashing-cylinder.

I claim as my invention—

1. The combination, in a machine of the class described, with the slotted feed-board D', of the crank-shaft E, arranged below said feed-board, the guides F', secured beneath the feed-board, and the curved feed-arms F, passing through the guides F' and having their curved ends arranged to pass through the slotted feed-board and their opposite ends mounted on the cranks of shaft E, as and for the purpose set forth.

2. The combination, with the hopper, having the inclined slotted bottom $c'$, and the slotted feed-board D', of the crank-shaft E, located beneath said feed-board, guides F', curved arms E, attached to the crank-shaft and passing through said guides, knife G', and means for operating the knife, all substantially as described.

3. The combination, with the hopper, the crank-shaft E, feed-arms F, and guides F', of the crank-shaft G, knife G', and guide $g^2$, substantially as described.

4. The combination, with the box D, having the slotted bottom and slotted top, of the crank-shaft E, feed-arms F, crank-shaft G, and knife G', all substantially as described.

5. The combination, with the crank-shaft E and feed-arms F, of the reciprocating plungers H, the crank-shaft G, and knife G', all substantially as described.

6. The combination, in a band-cutting machine, with the feed-box D, having the slotted top and means for feeding the bundles of grain therein, of the crank-shaft G, the guide $g^2$, and knife G', substantially as described.

7. The combination, with the feed-table B and means for moving the grain to the thrashing-cylinder, of the slotted feed-board D', the crank-shaft E, guides F', arms F, and means, as described, for cutting the bands, as and for the purpose set forth.

8. The combination, with the feed-table and thrashing-cylinder, of the shaft I, located over the cylinder and having the oppositely-set cranks $i$ $i$, the slotted guides $j$ $j$, located between said cranks and the feed-table, and the rods J' J', carrying rakes J J, said rods being attached to the cranks $i i$ and passing through the slotted guides, all substantially as described.

ALEXANDER McVEETY.

Witnesses:
JAMES KEYS,
A. C. PAUL.